United States Patent [19]

Alten

[11] Patent Number: 5,418,993
[45] Date of Patent: May 30, 1995

[54] BRIDGE MEMBER FOR RAMPS

[76] Inventor: Kurt Alten, Ringstr. 14, D-30974 Wennigsen, Germany

[21] Appl. No.: 245,608
[22] Filed: May 20, 1994

[30] Foreign Application Priority Data

May 21, 1993 [DE] Germany ............ 43 16 957.0

[51] Int. Cl.6 ............................................. B65G 69/28
[52] U.S. Cl. ................................................. 14/71.1
[58] Field of Search ................... 14/69.5, 71.1, 71.3, 14/71.5, 71.7, 72.5; 414/401, 495, 584; 182/141

[56] References Cited

U.S. PATENT DOCUMENTS 4,718,136  1/1988  Fisher et al. ................ 14/71.7 X

FOREIGN PATENT DOCUMENTS 4128311  8/1992  Germany .

Primary Examiner—Ramon S. Britts
Assistant Examiner—James A. Lisehora
Attorney, Agent, or Firm—Robert W. Becker & Associates

[57] ABSTRACT

A bridge member for bridging a loading ramp to a platform to be loaded or unloaded has a bridge plate with a sheet metal cover whereby the bridge plate has a first end, connected to the ramp so as to be pivotable about a horizontal axis. An extension is connected to the second end of the bridge plate so as to be pivotable from a vertical rest position into an operative position in which the extension is positioned in a plane of the bridge plate for supporting the bridge member on the platform. The extension has at least one eye for connecting the extension to the second end of the bridge plate. Holders are connected to the underside of the sheet metal cover and have an end facing the extension that is provided with a bore. A bolt is inserted into the eyes and the bores of the holders such that the extension is pivoted about the bolt. A first rod and a second rod extend parallel to the plane of the bridge plate and perpendicular to a longitudinal extension of the bridge plate between the first and second ends. The first and second rods extend parallel to one another. The first end of each holder has an arc-shaped receiving element for engaging the first rod. The second end of the holders rests on the second rod.

10 Claims, 3 Drawing Sheets

BRIDGE MEMBER FOR RAMPS

BACKGROUND OF THE INVENTION

The present invention relates to a bridge member for ramps with a bridge plate that is pivotable about a horizontal axis at its end facing the ramp and has an extension that is provided at the free end of the bridge plate. The extension is pivotable from a substantially vertical rest position into an operating position in which the extension is substantially arranged in the plane of the bridge plate. The extension serves to rest and support the bridge member on the platform that is to be loaded or unloaded whereby the extension is connected with a transversely extending bolt to the bridge plate, the bolt being positioned in an eye of a holder that is fixedly connected to the bridge plate.

In known bridge members of the aforementioned kind the holder that is provided with the eye is connected by welding to the bridge plate, preferably to a plate-shaped reinforcement element which extends transverse to the longitudinal direction of the bridge plate. Thus, welding is required not only for attaching the reinforcement elements, but also for attaching the holder to be connected to the bridge plate.

It is therefore an object of the present invention to provide a bridge member of the aforementioned kind with which the attachment and mounting of the holders is simplified without compromising the stability and durability of the inventive device.

SUMMARY OF THE INVENTION

The bridge member for bridging a loading ramp to a platform to be loaded or unloaded according to the present invention is primarily characterized by:

A bridge plate with a sheet metal cover, the bridge plate having a first end, connected to a ramp so as to be pivotable about a horizontal axis, and a second end;

An extension connected to the second end of the bridge plate so as to be pivotable from a substantially vertical rest position into an operative position in which operative position the extension is substantially positioned in a plane of the bridge plate for supporting the bridge member on the platform;

The extension having at least one eye for connecting it to the second end of the bridge plate;

At least one holder connected to an underside of the sheet metal cover having a first end facing the ramp and a second end facing the extension, the second end facing the extension having a bore;

A bolt inserted into the at least one eye and the bore of the at least one holder such that the extension is pivotable about the bolt;

A first rod and a second rod extending parallel to the plane of the bridge plate and perpendicular to a longitudinal extension of the bridge plate between the first and second ends;

The first and second rods extending parallel to one another;

The first end of the holder having an arc-shaped receiving element for engaging the first rod; and The second end of the holder resting on the second rod.

Preferably, the bridge plate comprises supports extending in the longitudinal extension of the bridge plate on which the sheet metal cover is supported, the supports having first and second cutouts for receiving the first and second rods wherein the first and second cutouts are shaped to match the contour of the first and second rods.

Advantageously, the first rod has a circular cross-section and the first cutout in the holder for receiving the first rod is substantially semi-circular.

Expediently, the holder has a top side with a projection and the sheet metal cover has a free end face at the second end of the bridge plate, the projection being positioned at the free end face to provide an abutment for the extension in the operative position. Preferably, the top side of the holder has a first abutment surface for a bottom side of the extension and a second abutment surface for the underside of the sheet metal cover. The first and second abutment surfaces are positioned at different levels and are arranged such that an upper surface of the sheet metal cover and an upper surface of the extension are in a common plane when the extension is in the operative position.

Advantageously, the second end of the holder has a vertical abutment surface for the bottom side of the extension when the extension is in the rest position. Preferably, the projection rests at the end face.

The first end of the holder preferably has an end section that is substantially shaped as a segment of an arc. Preferably, a radial extension of the segment of the arc is substantially equal to a spacing of the first rod to the underside of the sheet metal cover.

Advantageously, the holder rests essentially free of play at the underside of the sheet metal cover and the first and second rods.

According to the present invention, the holder rests at the underside of the sheet metal cover of the bridge plate, engages with its rearward end facing the ramp with an arc-shaped element a first rod extending transverse to the longitudinal extension of the bridge plate and rests with its forward end on a second rod extending parallel to the first rod. Advantageously, the first and second rods are supported at supports which extend in the longitudinal direction of the bridge plate, preferably by insertion into cutouts of these supports. Expediently, the holder is furthermore provided with an upwardly extending projection abutting at the forward end face (facing the extension) of the sheet metal cover.

Such a design and arrangement of the holder no longer requires fastening by welding and plate-shaped reinforcement elements extending transverse to the longitudinal extension of the bridge. It is important that the first and second rods have a form-locking connection to the bridge plate, and also have a sufficiently stable attachment to the bridge plate in order to prevent pivoting of the holder away from the bridge plate. The fastening of the first and second rods can be achieved advantageously in a simple manner by inserting the first and second rods into bores or cutouts of the neighboring supports of the bridge plate while the aforementioned shaping as a segment of an arc of the first end of the holder allows for the possibility that during mounting of the holder the desired form-locking can be achieved by pivoting of the holder.

BRIEF DESCRIPTION OF THE DRAWINGS

The objects and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 5.

Figure 3:
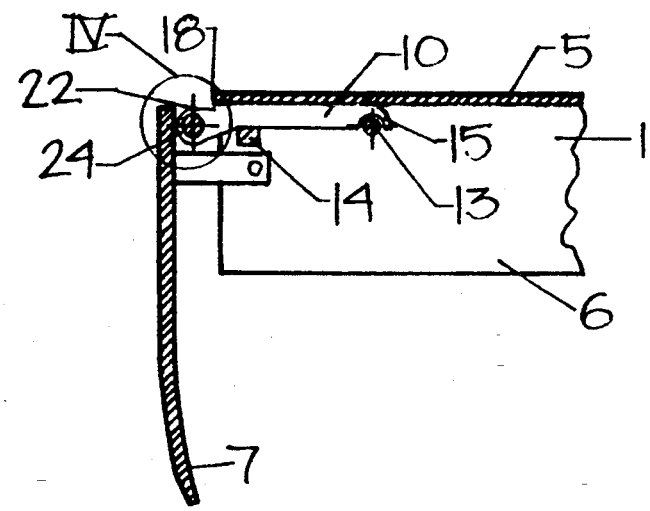
FIG. 3 shows a section along line III—III of FIG. 1.
Figure 4:
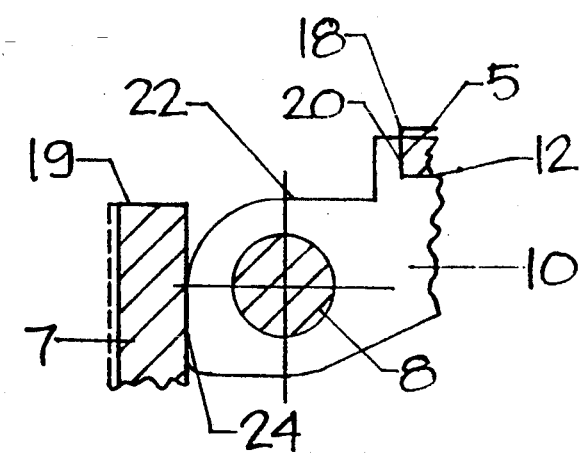
FIG. 4 shows an enlarged representation of the encircled portion IV of FIG. 3.

The bridge plate 1 of the bridge member is pivotably supported at a horizontal axis 3 at the ramp 4 and is comprised essentially of a sheet metal cover 5 and supports 6 extending spaced apart and parallel to one another to the forward end of the sheet metal cover 5. At the free forward end of the bridge plate 1, the bridge member is provided with an extension 7 which serves to support the bridge member on a platform to be loaded or unloaded. With this extension 7, the bridge member also supports itself during operation on the platform and thus follows any height adjustments of the platform. When the extension 7 is practically positioned within the plane defined by the sheet metal cover 5, the extension 7 is in its upwardly pivoted position (operational position). In the non-operative position (rest position) of the bridge member the extension 7 is downwardly pivoted and is substantially in a vertical position (FIG. 3).

The extension 7 is connected to the bridge plate 1 with a horizontally extending bolt 8 which is positioned in an eye 9 that is connected to the extension 7 and surrounds the bolt 8. The invention is primarily concerned with the attachment of this bolt 8, optionally a plurality of aligned bolts 8, at the bridge plate 1 so as to be spaced at a small distance from the free end of the bridge plate 1 and slightly below the sheet metal cover 5.

For attaching the bolt 8 to the bridge plate 1 a plurality of holders 10 is distributed over the width of the bridge member which holders 10 are provided with a bore 11 for receiving the bolt 8. The holders 10 are shaped like a latch and are embodied as formed bodies, for example, made of steel or aluminum. At their top side they have a planar surface 12 for abutting at the underside of the sheet metal cover 5. For fastening the holders 10 to the bridge plate 1 and for its securing against displacement, the supports 6 extending in the longitudinal direction of the bridge member are provided with cutouts that are penetrated by transversly extending elements in the form of a first rod 13 and a second rod 14 whereby the first rod 13 has a circular cross-section and the second rod 14 has a rectangular, respectively, square cross-section. These securing elements 13, 14 are thus simply inserted into aligned bores, respectively, cutouts 17 in the supports 6 and, if desired, can be secured against axial displacement by conventional means.

Figure 5:
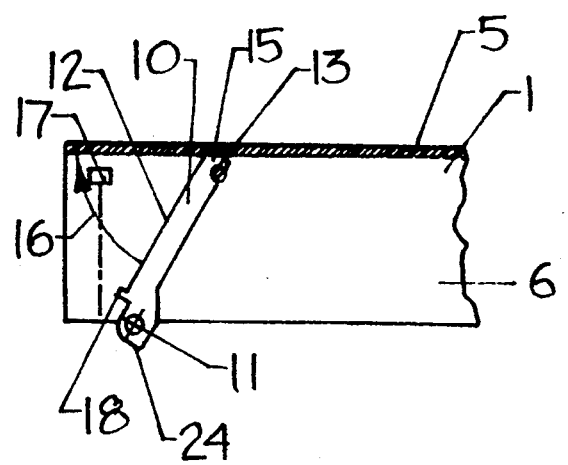
FIG. 5 shows a longitudinal section of the forward portion of the bridge plate during mounting of the holder.

At the rearward end of the holder 10 (the end facing theh ramp) a semi-circular cutout (arc-shaped receiving element) for receiving the first rod 13 is provided in order to achieve a form-locking engagement of the first rod 13 within the holder, respectively, in order to prevent displacement of the holder 10 in the longitudinal direction. The end of the holder 10 facing the ramp is furthermore provided with an end section 15 in the form of a segment of an arc. This makes it possible that the first rod 13 is first inserted along the width of the bridge member into the holders 10 and subsequently, according to FIG. 5, the holders 10 are then pivoted from a downwardly pivoted position into a horizontal position. When this position has been reached, the second rod 14 is then introduced into the cutouts of the supports 6. By doing so, all of the holders 10 distributed over the width of the bridge member are fixed by the second rod 14. The pivoting directions of the holders 10 is indicated by reference numeral 16 in FIG. 5. In FIG. 5 the cutout 17 of the support 6 for receiving the rod 14 is also shown.

Of further importance is a vertically upwardly extending projection 18 on the holder 10. This projection 18 prevents the rearward end face 19 of the extension 7 from abutting directly at the forward end face 20 of the sheet metal cover 5. This also allows for compensation of tolerances. On both sides of the projection 18 the abutment surface 12 for the sheet metal cover 5 and abutment surface 22 for the rearward end of the extension 7 are provided at different levels in order to be able to compensate for the differences in wall thickness of the extension 7 and the sheet metal cover 5. This is advantageous with respect to a step-free transition between the bridge plate 1 and the extension 7.

The bore 11 of the holder 10 for receiving the bolt 8 has a vertical abutment surface 24 for the bottom surface of the extension 7 in order to provide in the rest position of the extension 7 an abutment for the extension 7, as shown in FIG. 3. The extension 7 at its bottom side is furthermore provided with a lever 25 that can be engaged by a pivoting or adjusting cylinder etc.

Figure 1:
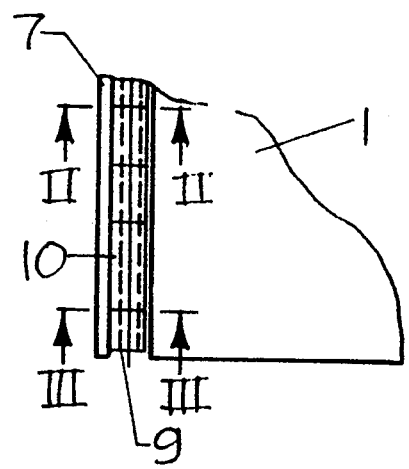
FIG. 1 shows a partial top view of a forward section of a bridge member with a downwardly folded extension.
Figure 2:
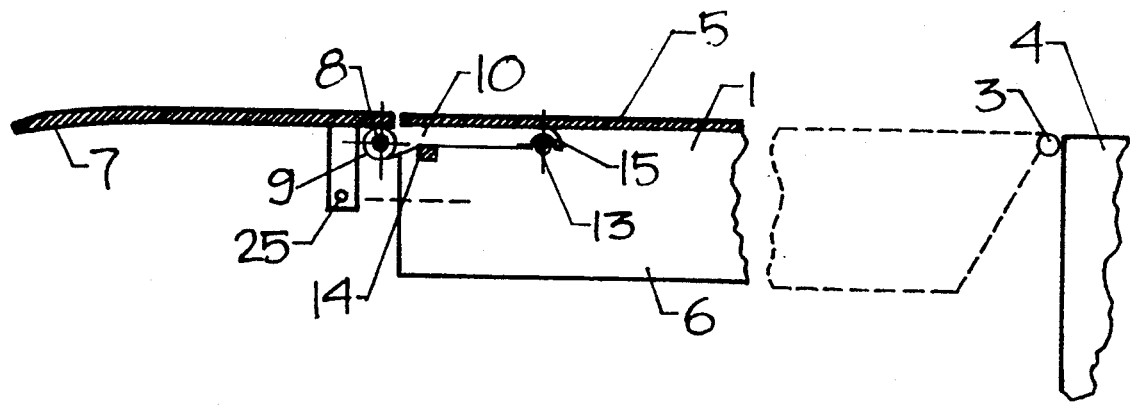
FIG. 2 shows in section according to line II—II of FIG. 1 in a schematic representation the rearward portion of the bridge member whereby, however, in contrast to FIG. 1 the extension is upwardly pivoted and is in its operative position.

FIG. 1 shows that the eye 9 and the holder 10 are alternatingly arranged, whereby the alternating arrangement depends on the number of holders 10 to be installed and the number of eyes 9 connected to the extension 7.

It is further shown in FIGS. 3 and 5 that the radial extension of the end section 15 practically corresponds to the distance of the rod 13 to the sheet metal cover 5 in order to thus provide a secure positioning of the holder 10.

What I claim is:

1. A bridge member for bridging a loading ramp and a platform, said bridge member comprising:

a bridge plate with a sheet metal cover, said bridge plate having a first end, connected to a ramp so as to be pivotable about a horizontal axis, and a second end;

an extension connected to said second end of said bridge plate so as to be pivotable from a substantially vertical rest position into an operative position in which operative position said extension is substantially positioned in a plane of said bridge plate for supporting said bridge member on the platform;

said extension having at least one eye for connecting said extension to said second end of said bridge plate;

at least one holder connected to an underside of said sheet metal cover having a first end facing the ramp and a second end facing said extension, said second end facing said extension having a bore;

a bolt inserted into said at least one eye and said bore of said at least one holder such that said extension is pivotable about said bolt;

a first rod and a second rod extending parallel to the plane of said bridge plate and perpendicular to a longitudinal extension of said bridge plate between said first and second ends;

said first and second rods extending parallel to one another;

said first end of said holder having an arc-shaped receiving element for engaging said first rod; and said second end of said holder resting on said second rod.

2. A bridge member according to claim 1, wherein said bridge plate comprises supports extending in the longitudinal extension of said bridge plate on which said sheet metal cover is supported, said supports having first and second cutouts for receiving said first and second rods, wherein said first and second cutouts are shaped to match the contour of said first and second rods.

3. A bridge member according to claim 2, wherein said first rod has a circular cross-section and wherein said first cutout in said holder for receiving said first rod is substantially semi-circular.

4. A bridge member according to claim 1, wherein said holder has a top side with a projection and said sheet metal cover has a free end face at said second end of said bridge plate, said projection being positioned at said free end face to provide an abutment for said extension in said operative position.

5. A bridge member according to claim 4, wherein said top side of said holder has a first abutment surface for a bottom side of said extension and a second abutment surface for said underside of said sheet metal cover, wherein said first and second abutment surfaces are positioned at different levels and are arranged such that an upper surface of said sheet metal cover and an upper surface of said extension are in a common plane when said extension is in said operative position.

6. A bridge member according to claim 5, wherein said second end of said holder has a vertical abutment surface for said bottom side of said extension when said extension is in said rest position.

7. A bridge member according to claim 4, wherein said projection rests at said end face.

8. A bridge member according to claim 1, wherein said first end of said holder has an end section that is substantially shaped as a segment of an arc.

9. A bridge member according to claim 8, wherein a radial extension of said segment of the arc is substantially equal to a spacing of said first rod to said underside of said sheet metal cover.

10. A bridge member according to claim 1, wherein said holder rests essentially free of play between said underside of said sheet metal cover and said first and second rods.

* * * * *